United States Patent
Capewell et al.

(10) Patent No.: US 8,159,491 B2
(45) Date of Patent: Apr. 17, 2012

(54) APPARATUS AND METHOD FOR TRACING ACTIVITIES OF A SHADER PROGRAM EXECUTED ON SHADER CIRCUITRY OF A DATA PROCESSING APPARATUS

(75) Inventors: Martyn Capewell, Cambridge (GB); David John Butcher, King's Lynn (GB); Robert James Catherall, Cambridge (GB); Peter James Horsman, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 12/591,895

(22) Filed: Dec. 3, 2009

(65) Prior Publication Data
US 2010/0149185 A1 Jun. 17, 2010

(30) Foreign Application Priority Data
Dec. 15, 2008 (GB) .................................. 0822853.8

(51) Int. Cl.
G06T 15/50 (2011.01)
G06T 1/60 (2006.01)
G06F 9/44 (2006.01)
(52) U.S. Cl. ...................... 345/426; 345/530; 717/127
(58) Field of Classification Search .................. 345/426, 345/501, 502, 505, 506, 522, 530, 541, 542, 345/545; 717/124, 127
See application file for complete search history.

(56) References Cited

U.S. PATENT DOCUMENTS
5,682,522 A * 10/1997 Huang et al. .................. 345/542
6,931,492 B2 * 8/2005 Fox et al. ...................... 711/129
(Continued)

FOREIGN PATENT DOCUMENTS
GB 2 445 219 7/2008
JP 01162947 6/1989

OTHER PUBLICATIONS
Search Report for UK 0822853.8 dated Sep. 16, 2009.
(Continued)

Primary Examiner — Joni Hsu
(74) Attorney, Agent, or Firm — Nixon & Vanderhye P.C.

(57) ABSTRACT

A data processing apparatus and method are provided for tracing activities of a shader program executed on shader circuitry of a data processing apparatus. The data processing apparatus comprises shader circuitry which is responsive to input data for a pixel to execute a shader program to generate a color value for the pixel. The shader program has multiple execution paths via which the color value may be generated, and which execution path is taken is dependent on the input data. An image buffer having a plurality of storage locations is provided, with each storage location being used to store the color value generated by the shader circuitry for an associated pixel. In a trace mode of operation, execution of the shader program by the shader circuitry causes a trace vector to be generated containing a plurality of items of execution path information indicative of the execution path taken, the trace vector comprising a plurality of fields, each field being used to store one item of execution path information. The trace vector as output is constrained to be of the same size as the color value, and in the trace mode of operation the trace vector is stored in one of the storage locations of the image buffer in place of the color value generated by the shader program. This has been found to provide an efficient mechanism for obtaining execution path data useful when performing a variety of debugging activities in respect of a shader program.

17 Claims, 8 Drawing Sheets

U.S. PATENT DOCUMENTS

| | | | | |
|---|---|---|---|---|
| 7,080,283 B1 * | 7/2006 | Songer et al. | | 714/30 |
| 7,095,416 B1 * | 8/2006 | Johns et al. | | 345/522 |
| 7,218,291 B2 * | 5/2007 | Abdalla et al. | | 345/24 |
| 7,366,885 B1 * | 4/2008 | Radhakrishnan et al. | | 712/241 |
| 7,548,238 B2 * | 6/2009 | Berteig et al. | | 345/426 |
| 7,802,236 B2 * | 9/2010 | Calder et al. | | 717/130 |
| 2004/0249623 A1 * | 12/2004 | Selvidge et al. | | 703/23 |

OTHER PUBLICATIONS

M. Hilgart, "Step-Through Debugging of GLSL Shaders", *School of Computer Science*, DePaul Univ., pp. 1-15 (No Date).

Strengert et al., "A Hardware-Aware Debugger for the OpenGL Shading Language", *Graphics Hardware*, Aug. 2007, 9 pages.

\* cited by examiner

APPARATUS AND METHOD FOR TRACING ACTIVITIES OF A SHADER PROGRAM EXECUTED ON SHADER CIRCUITRY OF A DATA PROCESSING APPARATUS

FIELD OF THE INVENTION

The present invention relates to an apparatus and method for tracing activities of a shader program executed on shader circuitry of a data processing apparatus.

BACKGROUND OF THE INVENTION

In modern 3D graphics systems, for each pixel within a polygon, it is possible to execute a program called a fragment shader (also referred to as a pixel shader). The fragment shader is used to determine the colour of a pixel based on input data related to that pixel and decisions made during the execution of the fragment shader code.

When developing a fragment shader program, it is important to be able to thoroughly test the operation of the fragment shader program in order to ensure it will operate as intended. Various issues are relevant when seeking to test the operation of a fragment shader program. Firstly, considering fragment shader optimisation, the time required to execute a fragment shader program is critical to maintaining a smooth 3D graphical experience, but the complexity of scenes, and thus shaders, can vary greatly. It would be desirable to provide a programmer with information about how the pixels of various rendered frames are processed by the fragment shader program, as this would provide the programmer with more details as to the execution time of the fragment shader program, allowing him/her to identify potential performance problems, for example particular values of input data which the shader program takes a relatively long time to generate the colour value for, and hence would allow the programmer to identify certain portions of the program shader code which require modification in order to alleviate the performance problems.

In addition, considering the issue of code coverage measurement, ensuring that all code paths in a program are tested is as important in fragment shaders as in any other programs. Accordingly, it would be desirable to provide a technique which during a testing operation generated information about which parts of the fragment shader code were executed during the generation of colour values for a sequence of input data, thereby identifying to the user any need for additional testing, or giving a user confidence in the correctness of their code by knowing that all parts of the fragment shader code have been tested.

Considering the issue of fragment shader debugging, the varying nature of 3D scenes makes debugging fragment shader programs difficult. For example, visual glitches may only be exhibited rarely by dynamically changing geometry. It would be desirable to provide a technique which during a debugging process provided information about the portions of fragment shader code that were used to generate the colour values for every pixel in a number of frames, since that would assist in the identification of sections of code that cause the bug, for example a visual glitch, thereby decreasing the time required to identify and fix the bug.

The article "Step-Through Debugging of GLSL Shaders" by Mark Hilgart, School of Computer Science, DePaul University, Chicago, USA, published at the website address http://facweb.cs.depaul.edu/research/techreports/TR06-015.pdf describes a rewriting method that enables step-through debugging on GLSL (OpenGL Shading Language) shader programs that are running in their intended application. Full-screen debugging is used first to identify interesting pixels, and then for those individual pixels of interest, the shader program code is stepped through line by line in order to understand the behaviour of the shader program code for those pixels. In particular, the described technique allows individual lines of code to be selected, and then the intermediate value of a selected variable at that line of code to be determined, with that intermediate value then being output as the colour value. Measures are described for enabling the remaining part of the shader program to be skipped to prevent the intermediate value of the selected variable being overwritten prior to output by the shader program.

Since the process described in the above article requires single stepping through the lines of code making up the fragment shader, it is inherently a very invasive debugging technique. Further, the described process is very labour intensive, since to understand how the input data for any particular pixel of interest is processed by the shader program, it is necessary to perform the single stepping process multiple times for multiple different lines of code in order to determine the intermediate values of selected variables at each of those lines of code. Furthermore, because of the invasive nature of the single stepping operation, it cannot be guaranteed that the code is operating in exactly the same way as it would if execution were not halted between each line of code.

The paper "A Hardware-Aware Debugger for the OpenGL Shading Language" by M Strengert et al, Graphics Hardware 2007, San Diego, Calif., 4-5 Aug. 2007, describes a similar step-through mechanism to that disclosed in the above mentioned "Step-Through Debugging of GLSL Shaders" article, but in particular is concerned with the identification of whether an identified branch was taken or not taken. In particular a method is described by which a single branch (or single interim value) may be examined by a user. It suggests that the user must pre-select the branch in which he/she is interested, nm the shader, and then examine the resulting pixel values in the image buffer. The values indicate whether the single branch was taken or not taken.

As with the earlier article, the technique described in this paper is very labour intensive and invasive, and would require multiple runs through the process to establish information about how the input data for any particular pixel of interest is processed by the shader program.

Accordingly, it would be desirable to provide a technique which could more readily provide information about the operation of the fragment shader for particular input data, with the information being gathered in a less invasive and less labour intensive manner.

In the general field of providing on-chip diagnostic capabilities within integrated circuits, GB-A-2,445,219 describes an integrated circuit having both a functional circuit and a diagnostic circuit. Further, a single interface controller is provided which monitors signals associated with the functional circuit and the diagnostic circuit, and controls selective communication of a diagnostic signal and a functional signal across a single signal interface in dependence upon the monitored signal. As a result, the integrated circuit thus has a single interface that removes the need for a set of dedicated trace diagnostic or test pins.

SUMMARY OF THE INVENTION

Viewed from a first aspect, the present invention provides a data processing apparatus comprising: shader circuitry, responsive to input data for a pixel, to execute a shader program to generate a colour value for said pixel, the shader program having multiple execution paths via which the colour value may be generated, and which execution path of said plurality is taken being dependent on said input data; an image buffer having a plurality of storage locations, each storage location for storing the colour value generated by said shader circuitry for an associated pixel; in a trace mode of operation, execution of said shader program by said shader circuitry causing a trace vector to be generated containing a plurality of items of execution path information indicative of the execution path taken, the trace vector comprising a plurality of fields, each field being used to store one item of execution path information; the trace vector as output being of the same size as the colour value, and in said trace mode of operation said trace vector being stored in one of said storage locations of the image buffer in place of the colour value generated by the shader program.

In accordance with the present invention, in a trace mode of operation, when the shader program is executed on the shader circuitry, a trace vector is generated containing a plurality of items of execution path information indicative of the execution path taken through the shader program. The trace vector as output from the shader circuitry is constrained to be of the same size as the colour value, and then the image buffer provided to store the colour values generated by the shader circuitry is instead, in the trace mode of operation, used to store each trace vector. Hence, considering the input data for a particular pixel, when in the trace mode of operation, the trace vector generated will be stored in the relevant storage location of the image buffer in place of the colour value generated by the shader program.

Since the trace vector is constrained to be of the same size as the colour value, then this allows the image buffer to be reused for storing the trace vector data during the trace mode of operation, thereby eliminating the need for any additional dedicated trace buffer to be provided. By producing trace vectors containing a plurality of items of execution path information indicative of the execution path taken for particular input data, this enables the user of the trace vector information to understand which parts of the shader program are used for particular arrangements of input data. Hence, considering the earlier discussed fragment shader optimisation issue, the invention allows, via the trace vectors, access to per-pixel execution path data for a variety of rendered frames, allowing a programmer to visualise the execution time of a fragment shader, thereby allowing the programmer to identify potential performance problems, and to hence modify the code with the aim of seeking to alleviate those performance problems.

Similarly, considering the issue of code coverage measurement, the present invention can be used to obtain execution path data for every pixel in every visible polygon of a scene, and hence will assist the user in identifying areas of the fragment shader code that have not been executed, thus allowing the user to modify the test sequences so as to seek to utilise such unused shader code portions.

Similarly, considering the fragment shader debugging issue discussed earlier, the present invention can provide, via the trace vectors, an indication of the execution path utilised for every pixel in a sequence of frames, thereby making it easier to identify the sections of code that cause a bug to occur, thereby decreasing the time required to identify and fix the bug.

When compared with the teaching of the earlier referenced articles "Step-Through Debugging of GLSL Shaders" and "A Hardware-Aware Debugger for the OpenGL Shading Language", rather than using the colour value output path to record an intermediate value of a variable or a single branch taken/not taken indication obtained during a single step debugging procedure, the present invention allows the shader program to run in an uninterrupted manner and output via the colour value path a trace vector giving an indication of the execution path taken through the shader program. Multiple items of execution path information are captured within a single trace vector, provided that the trace vector as output is of the same size as the colour value and hence can be stored within a storage location of the image buffer, and accordingly a significant amount of information indicative of the execution path taken through the shader program can be obtained via a single execution of the shader program during the trace mode of operation.

It has been found that the present invention provides a particularly efficient mechanism for obtaining information about the execution path taken through a shader program for different sets of input data, and this information can assist in significantly improving the speed of testing shader programs, for example being particularly useful in the areas of fragment shader optimisation, code coverage measurement and fragment shader debugging.

The size of the colour value, and the size of the trace vector as output are dictated by the size of the storage locations in the image buffer. For example, if each storage location is 32 bits in length, then both the colour value and the trace vector as output will be 32 bits in length. It will be appreciated by those skilled in the art that either or both of the colour value and the trace vector may have unused bits. Hence, purely by way of example, in some embodiments only 24 bits of the 32 bit colour value may actively contain colour information. Similarly, the number of bits within the trace vector that actively contain items of execution path information may vary dependent on the shader program, and indeed on the paths taken through the shader program for any particular input data. For example, some paths through the shader program may be less complex than other paths through the shader program, and hence require less items of execution path information to be captured. Hence, the number of useful bits in the trace vector may be less than or equal to the number of available bits at the storage location for the corresponding pixel in the image buffer.

Further, it will be appreciated that whilst the storage locations have been discussed with reference to an example where they are 32 bits in length, there is no requirement for the storage locations to be 32 bits in length and any other suitable length of storage location may be provided, with that storage location length then dictating the size of the colour value and the trace vector.

The items of execution path information contained within the generated trace vector can take a variety of forms. However, in one embodiment, said plurality of items of execution path information comprise a plurality of branch result items, each branch result item identifying whether a corresponding branch operation within the shader program was taken or not taken. By recording for particular branch operations within the shader program, whether those branches were taken or not taken, this provides detailed information about the execution path taken through the shader program whilst requiring only a relatively small amount of data to be contained within the trace vector. In particular, only a single bit of data is required for each branch in order to identify whether that branch was taken or not taken.

Alternatively, or in addition, said plurality of items of execution path information comprise one or more loop count items, each loop count item identifying a number of times a corresponding loop within the shader program was repeated. By keeping track of the number of times a loop is repeated, this avoids the need to keep separate items of execution path information for each iteration through that loop, and therefore can provide a more efficient mechanism for providing execution path information in such instances.

In one embodiment, the fields within the trace vector used to store items of execution path information, and sizes of those fields, may be predetermined, but in some embodiments at least some of the fields may be inserted dynamically within the trace vector, for example dependent on decisions taken by the shader program at particular points in the shader program code where corresponding execution path information is to be inserted into the trace vector. As a particular example, in one embodiment, for at least one item of execution path information the trace vector is arranged to store supplemental information relevant to that item of execution path information. Whether the supplemental information is added or not may depend on the value of the item of execution path information being added to the trace vector. Hence, by way of example, considering as an item of execution path information a single bit value identifying whether a branch operation is taken or not taken, then in instances where the branch is taken, it may be decided to add into the trace vector some supplemental information, for example the value of a particular attribute that gave rise to the decision to take the branch. A field to store this supplemental information may then be added dynamically into the trace vector in association with the field used to store the branch taken indication.

In one embodiment, the number of bits of information added into the trace vector is constrained such that the size of the trace vector will never exceed the size of the colour value. However, in an alternative embodiment the trace vector maintained during the operation of the shader program may be allowed to exceed that size, but with a subsequent mechanism being used to reduce the size of the trace vector as output to ensure that the trace vector as output is of the same size as the colour value. There are a number of ways in which this can be achieved.

For example, in one embodiment, the data processing apparatus further comprises compression means for receiving the trace vector generated during execution of the shader program and for compressing the trace vector to an output form the same size as the colour value prior to output of the trace vector to the image buffer. The compression means can be embodied in a variety of ways. For example, the compression means may be formed by an additional portion of code added to the shader program to perform the compression on the trace vector prior to it being output for storage in the image buffer. Alternatively, the compression means may comprise additional hardware circuitry added to the shader circuitry to perform the required compression.

In an alternative embodiment, the data processing apparatus further comprises hashing means for receiving the trace vector generated during execution of the shader program and for applying a hash operation to convert the trace vector into an output form the same size as the colour value prior to output of the trace vector to the image buffer. Any of a number of known hash operations may be employed. As with the compression means, the hashing means may be embodied in a variety of ways, and hence, for example, in one embodiment the hashing means may be implemented by an extra code portion within the shader program, or alternatively the hashing means may be embodied by some hardware added to the shader circuitry.

It will be appreciated that when employing techniques such as compression or hashing to reduce the size of the trace vector prior to it being output for storage in the image buffer, some of the original information maintained within the trace vector prior to compression or hashing may be lost. However, as an alternative to performing such compression or hashing, if there is a need to track more execution path information than can be provided within a trace vector having the same size as the colour value, then in an alternative embodiment multiple iterations of the shader program can be used to generate multiple trace vectors which can later be combined to provide the required information. In particular, in one embodiment, in the trace mode of operation the shader program is executed multiple times using the same input data to produce multiple trace vectors, each trace vector containing a plurality of items of execution path information relating to different parts of the shader program, the data processing apparatus further comprising debugger means for obtaining each trace vector from the image buffer and for combining the multiple trace vectors to produce an enlarged trace vector containing execution path information indicative of the execution path taken through the shader program. The debugger means may in one embodiment be provided by software debugging routines, whilst in another embodiment the debugger means may at least partially be implemented in hardware. Further, the debugger means may be implemented in a system remote to the system on which the shader circuitry is provided, or alternatively may be provided within the same system as that containing the shader circuitry.

Since the multiple trace vectors in the above described embodiment are created using the same input data, they will be stored in the same location within the image buffer, and hence steps need to be taken to ensure that subsequently generated trace vectors do not overwrite previously generated trace vectors. If the image buffer is provided in main memory, this could be achieved by changing the area of memory used for the image buffer between each iteration, such that the debugger means could then later obtain from main memory the various different trace vectors, and combine them. However, in an alternative embodiment, if the image buffer memory is not changed between iterations, then in one embodiment the debugger means is arranged to obtain from the image buffer a current trace vector produced by a current iteration of the shader program before a next trace vector produced by a next iteration of the shader program is stored in the image buffer. This ensures that by the time the next trace vector is output to the image buffer, the current trace vector has been received by the debugger means, and hence will not be lost when the next trace vector is written to the image buffer.

The shader circuitry can be arranged in a variety of ways. However, in one embodiment, the shader circuitry has multiple execution pipelines, such that multiple instances of the shader program are executed in parallel, each instance of the shader program operating on input data for different pixels. Hence, when in the trace mode of operation, multiple separate trace vectors can be produced in parallel using the input data for a number of different pixels so as to produce in parallel execution path information indicative of the execution path taken by the shader program when processing those different sets of input data. Hence, such execution path data can be rapidly produced for multiple different sets of input data.

There are a number of different ways in which the shader program, when executing on the shader circuitry in the trace mode of operation, can generate the required trace vector. In one embodiment, the shader program as executed on the shader circuitry contains code portions that generate the trace vector during the trace mode of operation. These code portions can be inserted into the shader program by modifying the shader program code, either manually or with shader language macros. In an alternative embodiment, the code portions are added into the shader program by passing the shader program through a compiler which inserts those code portions at locations within the shader program associated with predetermined execution path trace trigger points. Hence, in such embodiments, a modified compiler is provided which automatically inserts the required code portions into the shader program so that when that shader program is then run the required trace vector is generated.

In an alternative embodiment, the shader circuitry includes hardware for generating the trace vector during the trace mode of operation. Hence, in this embodiment, the shader circuitry hardware supports the trace mode of operation, and when the trace mode of operation is entered, the additional hardware within the shader circuitry will operate to generate the required trace vector, with that trace vector then being substituted for the colour value prior to output to the image buffer.

The data processing apparatus can take a variety of forms. The shader circuitry may for example be dedicated circuitry for executing the shader program, such as for example may be provided within a graphics processing unit (GPU). However, in alternative embodiments, the shader circuitry may be a more general processing circuitry capable of executing the shader program, but may also be capable of running a variety of other programs, and hence for example it could be implemented by a general purpose execution unit within a central processing unit (CPU).

The shader circuitry and shader program can take a variety of forms. However, in one embodiment, the shader circuitry is fragment shader circuitry, and the shader program is a fragment shader program. Such fragment shader circuitry and fragment shader programs may alternatively be referred to as pixel shader circuitry and pixel shader programs.

Viewed from a second aspect, the present invention provides a method of generating execution path information when executing a shader program on shader circuitry, the method comprising the steps of: responsive to input data for a pixel, executing the shader program to generate a colour value for said pixel, the shader program having multiple execution paths via which the colour value may be generated, and which execution path of said plurality is taken being dependent on said input data; storing the colour value generated by said shader circuitry in an image buffer; in a trace mode of operation, the execution of said shader program by said shader circuitry causing a trace vector to be generated containing a plurality of items of execution path information indicative of the execution path taken, the trace vector comprising a plurality of fields, each field being used to store one item of execution path information; the trace vector as output being of the same size as the colour value, and in said trace mode of operation the method further comprising the steps of storing said trace vector in a storage location of the image buffer in place of the colour value generated by the shader program.

Viewed from a third aspect, the present invention provides a graphics processing unit comprising: shader circuitry, responsive to input data for a pixel, to execute a shader program to generate a colour value for said pixel, the shader program having multiple execution paths via which the colour value may be generated, and which execution path of said plurality is taken being dependent on said input data; the shader circuitry being arranged to output the colour value for storage in an image buffer having a plurality of storage locations, each storage location for storing the colour value generated by said shader circuitry for an associated pixel; in a trace mode of operation, execution of said shader program by said shader circuitry causing a trace vector to be generated containing a plurality of items of execution path information indicative of the execution path taken, the trace vector comprising a plurality of fields, each field being used to store one item of execution path information; the trace vector as output being of the same size as the colour value, and in said trace mode of operation said trace vector being output for storing in one of said storage locations of the image buffer in place of the colour value generated by the shader program.

Viewed from a fourth aspect, the present invention provides a compiler tool for creating a shader program from an initial shader program by inserting code portions at locations within the initial shader program associated with predetermined execution path trace trigger points, such that when said shader program is executed on shader circuitry, the method of generating execution path information in accordance with the second aspect of the present invention is performed.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
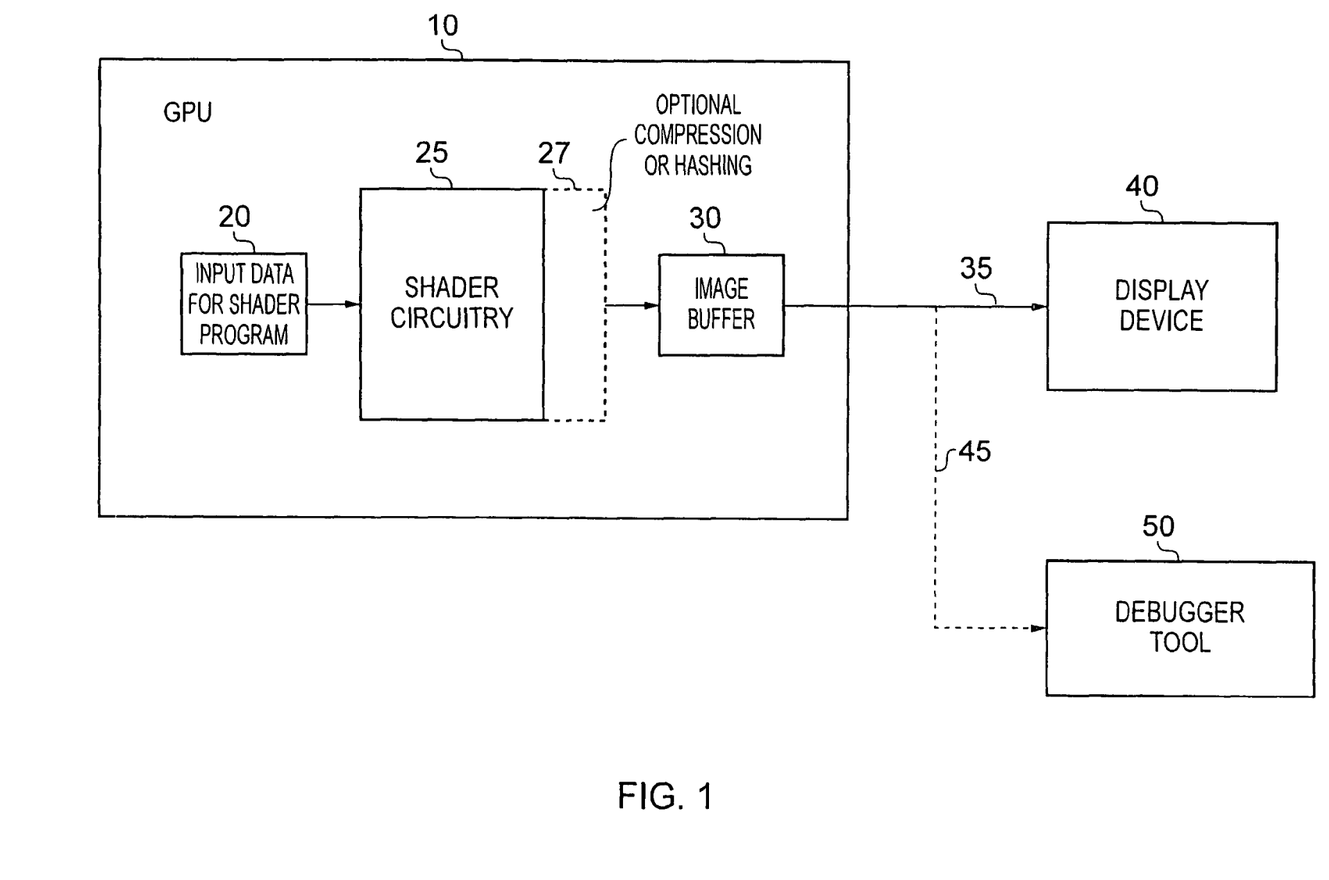
FIG. 1 is a block diagram of a data processing system incorporating a data processing apparatus in accordance with one embodiment of the present invention.

FIG. 1 is a block diagram of a data processing system in which a data processing apparatus of embodiments of the present invention may be provided. In this example, the data processing apparatus takes the form of a GPU 10 in which shader circuitry 25 is provided. Input data 20 is provided for supply to the shader circuitry 25, that input data having been produced using any of a number of standard processing steps on image data required to be displayed on screen. In particular, as is well-known to those skilled in the art, a display screen is typically divided into a number of polygons with attributes being associated with each vertex of the polygon. In addition, parameter values shared across an entire display scene, often referred to as "uniforms", may also be specified. A rasterizer circuit will then typically determine all of the pixels that are required to form each polygon. For a pixel within a particular polygon, the input attribute data for that pixel is typically derived by interpolation between the attributes of the various vertices of the polygon. In addition, any uniforms will also be provided as input data for that pixel. This input data 20 is then made available to the shader circuitry 25. Whilst the input data is shown schematically by the element 20 in FIG. 1, it will be appreciated that that input data may actually be stored in memory external to the GPU 10, and read into the GPU as and when required for provision to the shader circuitry 25.

For each pixel, the shader circuitry is arranged to execute a fragment shader program in order to determine a colour value for that pixel based on the input data 20 provided for that pixel, with the resultant colour value being stored in an image buffer 30.

Figure 2:
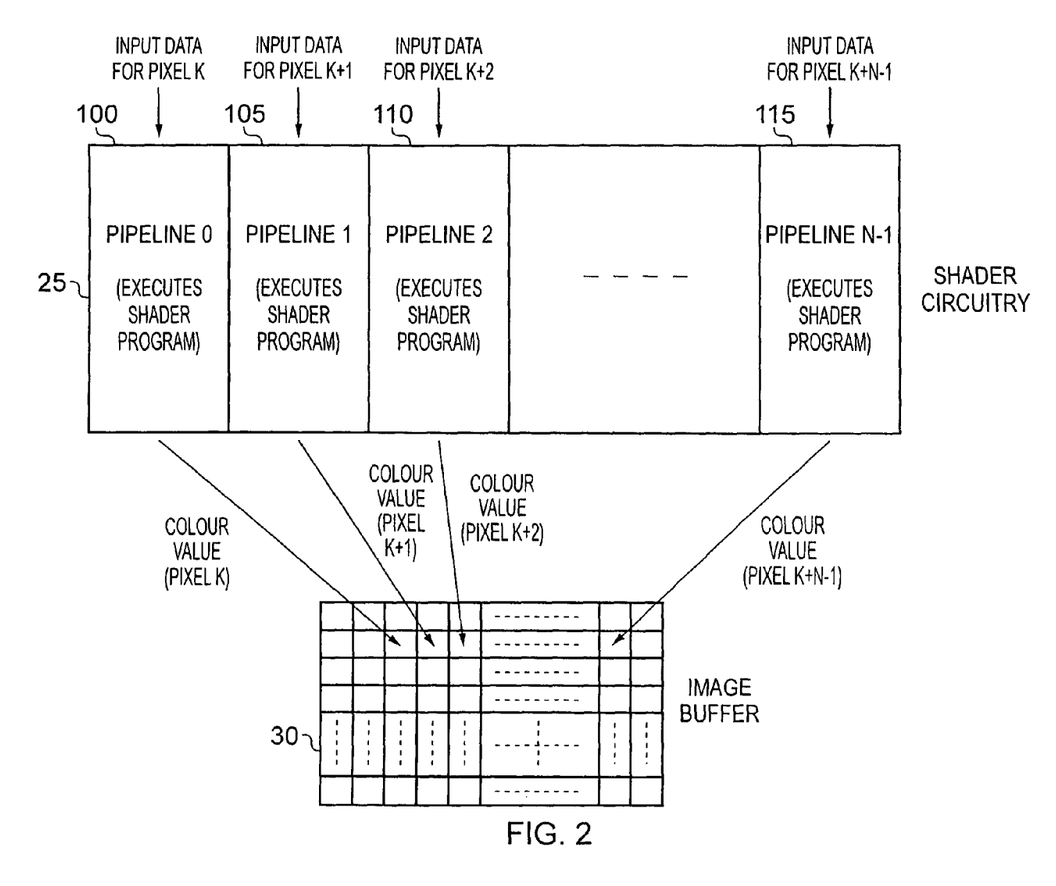
FIG. 2 schematically illustrates the operation of the shader circuitry of FIG. 1 in order to produce colour values for storing in the image buffer of FIG. 1.

In practice, the shader circuitry 25 typically comprises a plurality of parallel pipelines, each pipeline being capable of executing a shader program, as shown schematically in FIG. 2. Accordingly, as shown in FIG. 2, the shader circuitry may execute N instances of the shader program in parallel in the N pipelines 100, 105, 110, 115. Each pipeline receives the input data for a particular pixel, the provision of the input data for particular pixels to particular pipelines being controlled by a scheduler (not shown). Whilst in FIG. 2 the input data for adjacent pixels is provided to adjacent pipelines, it will be appreciated that there is no requirement for the scheduler to allocate the input data in this manner, and in principle the input data for any pixel can be provided to any pipeline. When a colour value is produced, it is written to a particular storage location in the image buffer, dependent on the pixel to which that colour value relates. Hence, as shown in FIG. 2, it can be seen that colour values for all of the required pixels in a scene can be calculated by executing the shader program multiple times, and these generated colour values can then be read out of the image buffer and passed over path 35 to the display device 40 shown in FIG. 1.

Each of the storage locations within the image buffer will be of a predetermined size, and accordingly the colour values output by the shader circuitry 25 will be of that predetermined size. It should be noted that not all of the bits in the output colour value need provide actual colour information, and accordingly by way of example, if the colour values are in RGB format, with 8 bits being provided for each of the red, green and blue components, then 24 bits of active colour information may be provided in the output colour value. However, the size of the output colour value will be determined by the size of the storage locations in the image buffer, and whilst these might for example be 24 bits in size, they may alternatively have some other size, for example 32 bits.

In accordance with embodiments of the present invention, a trace mode of operation is provided, where again input data for particular pixels are input to the shader circuitry, and the fragment shader program is executed for each set of input data. However, in the trace mode of operation, the execution of the shader program by the shader circuitry additionally causes a trace vector to be generated containing a plurality of items of execution path information indicative of the execution path taken through the shader program. In particular, the shader program has multiple execution paths via which the colour value may be generated, and which execution path is taken is dependent on the input data. In the trace mode of operation, at predetermined execution path trace trigger points within the shader program, certain execution path information is captured and added to a trace vector maintained whilst the shader program is executing. On completion of the shader program, the trace vector is then substituted for the generated colour value, such that the trace vector is stored in the relevant storage location of the image buffer instead of the colour value generated by the shader program.

The trace vector as output to the image buffer is constrained to be of the same size as the colour value, so that it can be stored within the relevant storage location. In one embodiment, the trace vector as maintained during the execution of the shader program is constrained so that its size will not exceed the colour value size. However, alternatively, as shown by the dotted box 27 in FIG. 1, optional compression or hashing functionality may be added to ensure that the trace vector as output to the image buffer 30 is of the same size as the colour value. Hence, if the internally maintained trace vector exceeds the colour value size, then any of a number of known compression techniques may be used to compress the trace vector to an output form that is the same size as the colour value. Similarly, in an alternative embodiment, any of a number of known hash operations may be applied to the internally generated trace vector in order to convert the trace vector into an output form that is the same size as the colour value. Such compression or hashing techniques may be implemented by software code added to the shader program, or alternatively may be performed by the addition of suitable hardware functionality to the shader circuitry 25.

When during the trace mode of operation, trace vectors are stored in the image buffer 30 instead of the generated colour values, then those trace vectors may subsequently be passed to a debugger tool 50 over path 45 for subsequent analysis. The debugger tool 50 may be implemented by software executing on a general purpose computer, which may for example be remote to the apparatus in which the GPU 10 is provided. Alternatively the debugger tool software may be running on the same apparatus as that on which the GPU is provided. This may be advantageous for example in systems where the image buffer 30 is provided internally within the GPU 10, as it may enable the debugger tool 50 to have more direct access to the contents of the image buffer 30. However, where the debugger tool 50 does not have direct access to the image buffer 30, the GPU 10 can be instructed to provide the contents of the image buffer to the debugger tool 50.

In alternative embodiments, the debugger tool may be implemented by hardware functionality, and again that hardware functionality may be provided remotely to the apparatus on which the GPU 10 is provided, or as an integral part of that apparatus.

Whilst in FIG. 1, the image buffer 30 is shown as being part of the GPU 10, in alternative embodiments the image buffer may be provided externally to the GPU 10, and hence for example may be provided by a portion of main memory accessible to the GPU 10.

Figure 3:
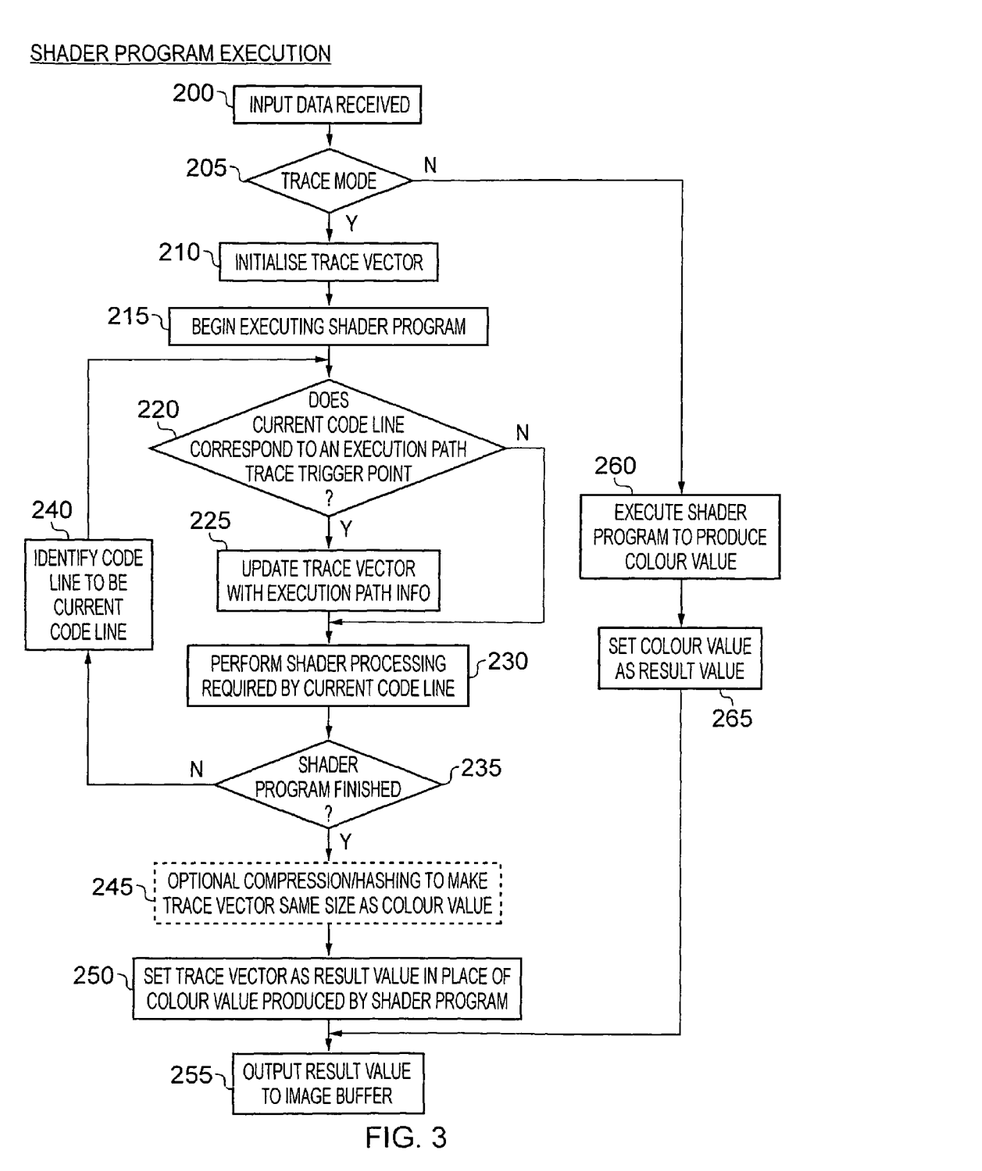
FIG. 3 is a flow diagram illustrating the steps performed by the shader program in both the normal mode of operation and a trace mode of operation, in accordance with one embodiment of the present invention.

FIG. 3 is a flow diagram illustrating the sequence of steps performed by the shader program, either when in a normal mode of operation, or in the trace mode of operation. At step 200, input data for a particular pixel is received as an input to the shader program, whereafter at step 205 it is determined whether the trace mode of operation is active. If not, then the shader program merely executes in the standard manner to the produce a colour value at step 260, whereafter at step 265 that colour value is set as a result value, which is then output to the image buffer at step 255.

However, if in the trace mode of operation, then the process proceeds to step 210 where a trace vector is initialised, whereafter at step 215 execution of the shader program begins. Thereafter, each executed code line of the shader program is evaluated at step 220 at the time it is executed in order to determine whether that code line corresponds to an execution path trace trigger point. Such execution path trace trigger points will typically be predetermined, and can be chosen to be any points which are relevant to an understanding of the execution path taken by the shader program. As will be discussed in more detail later, particular examples of such execution path trace trigger points are code lines where a branch operation is performed, or particular code lines associated with a loop operation where it is desired to keep track of the number of times such code lines are executed so as to keep track of the number of times the loop is performed.

If for a current code line it is determined that that code line does not correspond to an execution path trace trigger point, then the process proceeds to step 230 where the shader processing required by the current code line is performed. However, if at step 220 it is determined that the current code line does correspond to an execution path trace trigger point, then in addition to performing step 230, step 225 is performed in order to update the trace vector with execution path information obtained from the particular execution path trace trigger point. Examples of how this may be done will be discussed in more detail later with reference to FIG. 4. Whilst steps 225 and 230 are shown sequentially, it will be appreciated that these steps may be performed in parallel, or indeed part of the processing of step 230 may need to be performed before the relevant execution path information required to update the trace vector at step 225 is available.

Following step 230, it is determined at step 235 whether the shader program has finished, and if not the next code line to be executed is identified as the new current code line at step 240, whereafter the process returns to step 220. In the absence of a branch being taken, this next code line will typically be the next sequential code line in the program code, whereas in the event that a branch is taken, this next code line will be the code line at the destination of the branch.

It will be appreciated from the above discussion that whilst the trace vector is updated with execution path information, the shader program still continues to perform all its normal processing steps, and accordingly will still generate a colour value.

When at step 235 it is determined that the shader program has finished, then the process proceeds to step 250, optionally via a step 245 where any compression or hashing required to make the trace vector the same size as the colour value is performed. At step 250, the trace vector is set as the result value in place of the colour value produced by the shader program. As a result, at step 255, when the result value is output to the image buffer it will actually be the trace vector that is output to the image buffer in this instance.

Figure 4:
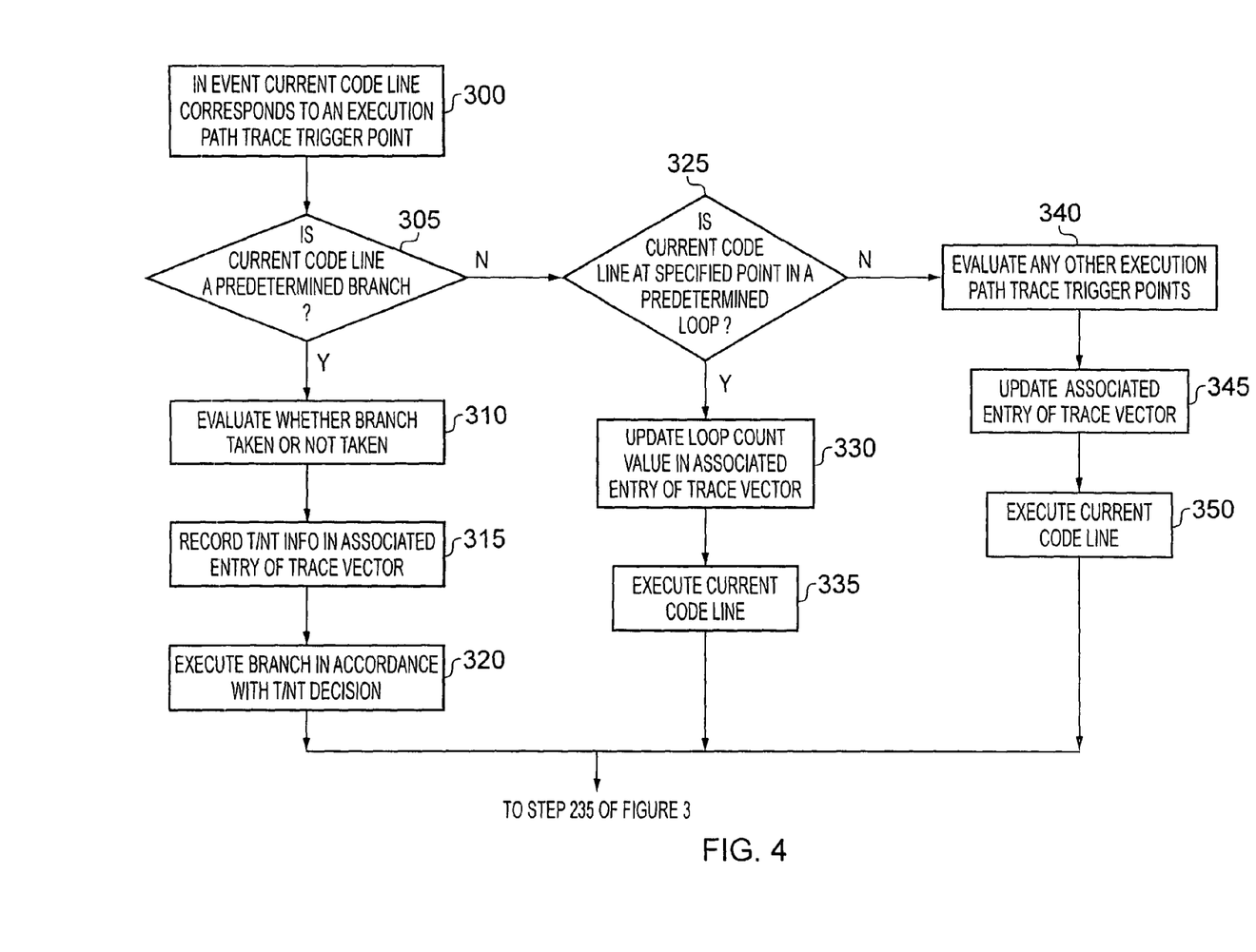
FIG. 4 is a flow diagram illustrating in more detail the steps performed in one embodiment of the present invention when a current code line corresponds to an execution path trace trigger point and the trace mode of operation is employed.

FIG. 4 schematically illustrates a sequence of steps that may be performed to implement the steps 225, 230 in FIG. 3 in the event that a current code line is determined at step 220 to correspond to an execution path trace trigger point, this corresponding to the starting point 300 in FIG. 4. At step 305, it is determined whether the current code line is a predetermined branch operation. If it is, then at step 310 it is determined whether the branch will be taken or not taken. In particular, branches are often conditional, and whether a branch is taken or not will depend on the values of one or more attributes at the time the branch operation is encountered.

Once it has been determined whether the branch will be taken or not, then that taken or not taken indication is stored in an associated entry of the trace vector at step 315. It will be appreciated that a single bit value is sufficient to encode this information within the trace vector. In addition to step 315, the branch is executed at step 320 in accordance with the taken or not taken decision evaluated at step 310. Thereafter, the process proceeds to step 235 in FIG. 3.

If at step 305 it is determined that the current code line is not a predetermined branch, it is then determined at step 325 whether the current code line is a code line at a specified point in a predetermined loop. The specified point may be any appropriate point within a sequence of code lines embodying the loop, and hence for example may be the first code line of the loop, the last code line of the loop, or indeed any intermediate code line within the loop. If it is determined at step 325 that the current code line is at a specified point in the predetermined loop, then at step 330 a loop count value maintained in an associated entry of the trace vector is updated. In particular, in one embodiment, this loop count value is incremented at step 330, since the occurrence of this code line identifies that an additional iteration of the loop is taking place. Thereafter, at step 335 the current code line is executed, whereafter the process proceeds to step 235 in FIG. 3. It will be appreciated that in addition to identifying predetermined branches and the reaching of particular points within predetermined loops, various other execution path trace trigger points could be identified, and accordingly if the current code line is not a predetermined branch and is not a specified point in the predetermined loop, then the process can proceed to step 340 where the presence of any other execution path trace trigger point is evaluated. On detection of the relevant execution path trace trigger point, the associated entry in the trace vector is updated at step 345, and the current code line is executed at step 350, whereafter the process proceeds to step 235 of FIG. 3.

Considering the steps 310 and 320 in FIG. 4, these illustrate an example where part of the shader processing required by the current code line needs to be performed before the relevant update to the trace vector can be made. It will be apparent that if the current code line does not correspond to an execution path trace trigger point, then steps 310 and 320 would still need to be performed, but no update of the trace vector would be required at step 315.

Figure 5A:
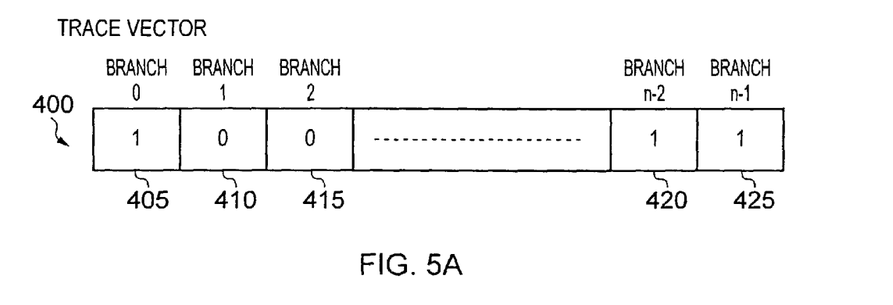
FIGS. 5A to 5C illustrate three example formats of the trace vector that may be used in embodiments of the present invention.

The trace vector can take a variety of forms. FIG. 5A illustrates one example form of the trace vector where each field in the trace vector stores an indication as to whether an associated branch operation was taken or not taken. Hence, in this example, the trace vector 400 is an n-bit field, where each bit is associated with a particular branch operation, and the value stored at that bit position indicates whether the branch was taken or not taken. In this example, a logic one value indicates that the branch was taken, and a logic zero value indicates that the branch was not taken, and accordingly fields 405, 420, 425 in this example identify taken branches and the fields 410, 415 identify not taken branches. However, it will be appreciated that the meanings of the logic one and logic zero values can be reversed in an alternative embodiment.

Figure 5B:
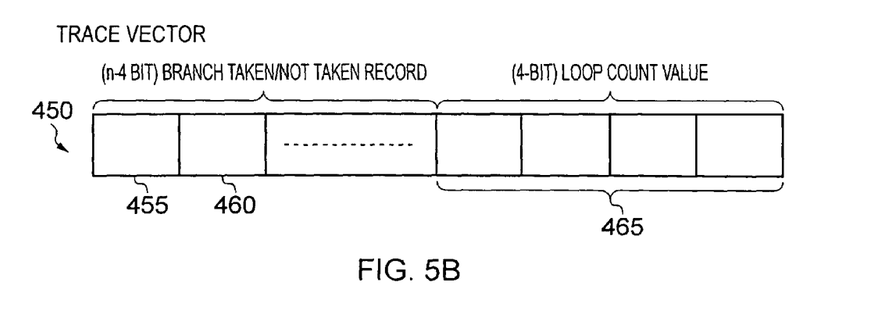

FIG. 5B illustrates an alternative form of trace vector, where in addition to fields 455, 460 maintaining branch taken/not taken information, a further field 465 is provided for storing a loop count value. The number of bits required for the loop count value will vary dependent on implementation, but in this example the loop count value is a 4-bit field, and the remaining n−4 bits of the trace vector 450 are used for storing branch taken/not taken information for a plurality of branch operations. The loop count value maintained in the field 465 can in one embodiment be arranged to be saturating, and hence considering the 4-bit example of FIG. 5B, if all of the bits are set equal to one, this indicates that the loop has been executed fifteen or more times.

Figure 5C:
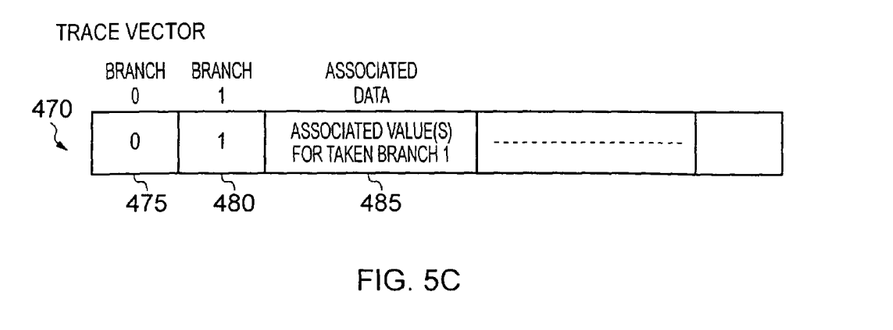

Whilst in FIGS. 5A and 5B, the number of fields, and the size of those fields can be predetermined, in an alternative embodiment the number of fields and size of the fields may be altered dynamically. In particular, in one example as shown in FIG. 5C, the trace vector 470 may again be used to store items of execution path information in the form of branch taken/not taken indications. However, in addition, each time a branch is taken, an additional multi-bit field may be provided for storing one or more associated values relevant to the branch taken decision. Purely by way of illustration, a particular branch operation may specify that the branch should be taken if a particular attribute value exceeds a predetermined value. In this instance, the actual value of that attribute may be stored within the associated field to provide more information as to why a branch was taken. Hence, as shown in FIG. 5C, the field 475 identifies that a branch was not taken, and accordingly no additional information is stored in association with that branch, whereas the field 480 identifies that the associated branch was taken, and accordingly an additional field 485 is added for storing the one or more associated values.

Figure 6:
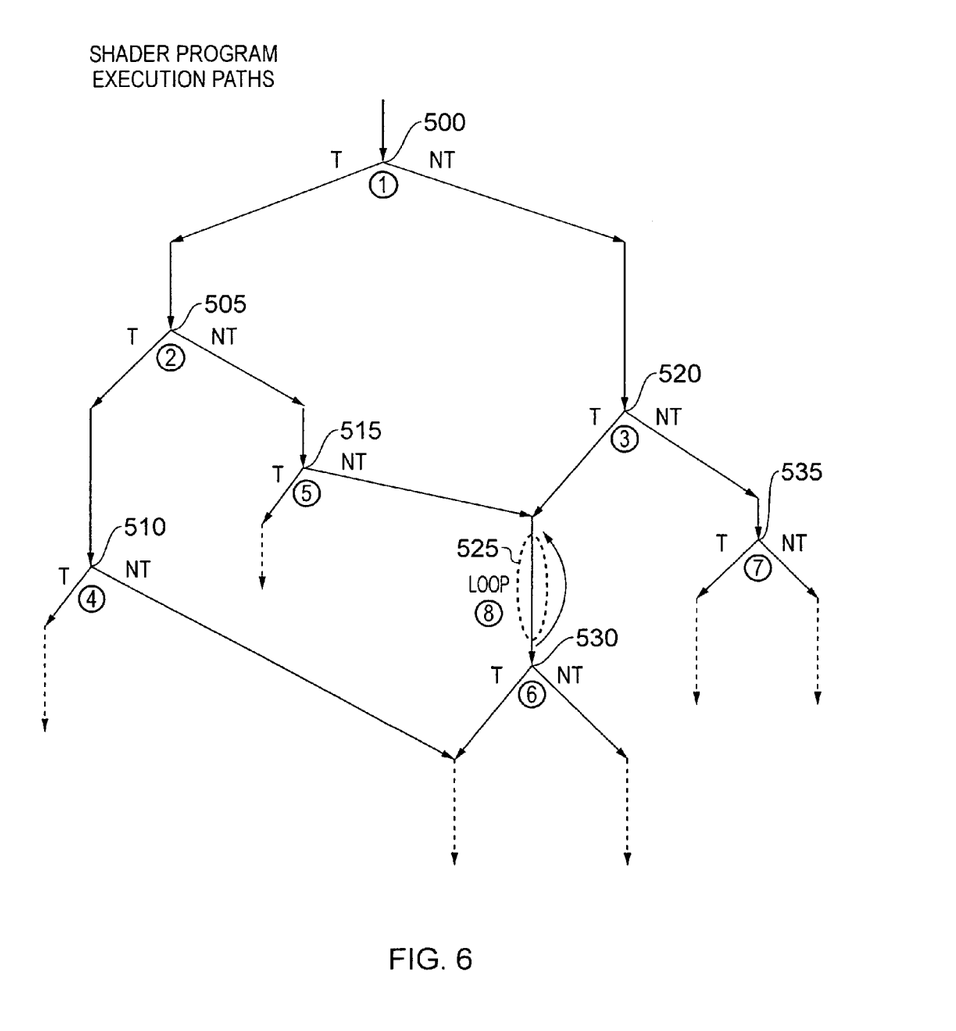
FIG. 6 schematically illustrates the various execution paths that may be provided within a shader program.

FIG. 6 schematically illustrates the various execution paths that may exist through a shader program. Each vertical line identifies one or more lines of code being executed. The points 500, 505, 510, 515, 520, 530 and 535 identify seven execution path trace trigger points where branch operations are performed, and in one embodiment the taken or not taken decision made at those points is stored within the trace vector. It should be noted that certain routes through the shader program re-combine later on, and hence by way of example, if at the branch point 515, the branch is not taken, the next code line executed is the same as that that would be executed if at branch point 520, the branch is taken.

Additionally, as shown in FIG. 6, certain loops may exist within the shader program, such as the loop 525 which would typically comprise multiple lines of code. Each time that loop is repeated, a count value is updated in the trace vector. Whilst in FIG. 6, the illustrated loop has no branches within it, some loops may also incorporate branches within them, and hence by way of example one loop may include a first sequence of code lines, followed by a second sequence of code lines resulting from a taken branch, and each time the first sequence of code lines are executed, the branch is taken and the second sequence of code lines are executed, then the loop count value could be updated.

At each of the lowermost points of the execution path, a colour value will be produced. Whilst not shown explicitly in FIG. 6, it will be appreciated that it may often be the case that the various execution paths converge to the same point, where a common final few lines of code are used to generate the final colour value.

Where the size of the execution path information desired to be traced exceeds the size of the colour value, then as mentioned earlier compression or hashing techniques may be used to convert the trace vector into an output form that is the same size as the colour value, prior to that trace vector being output to the image buffer.

Figure 7:
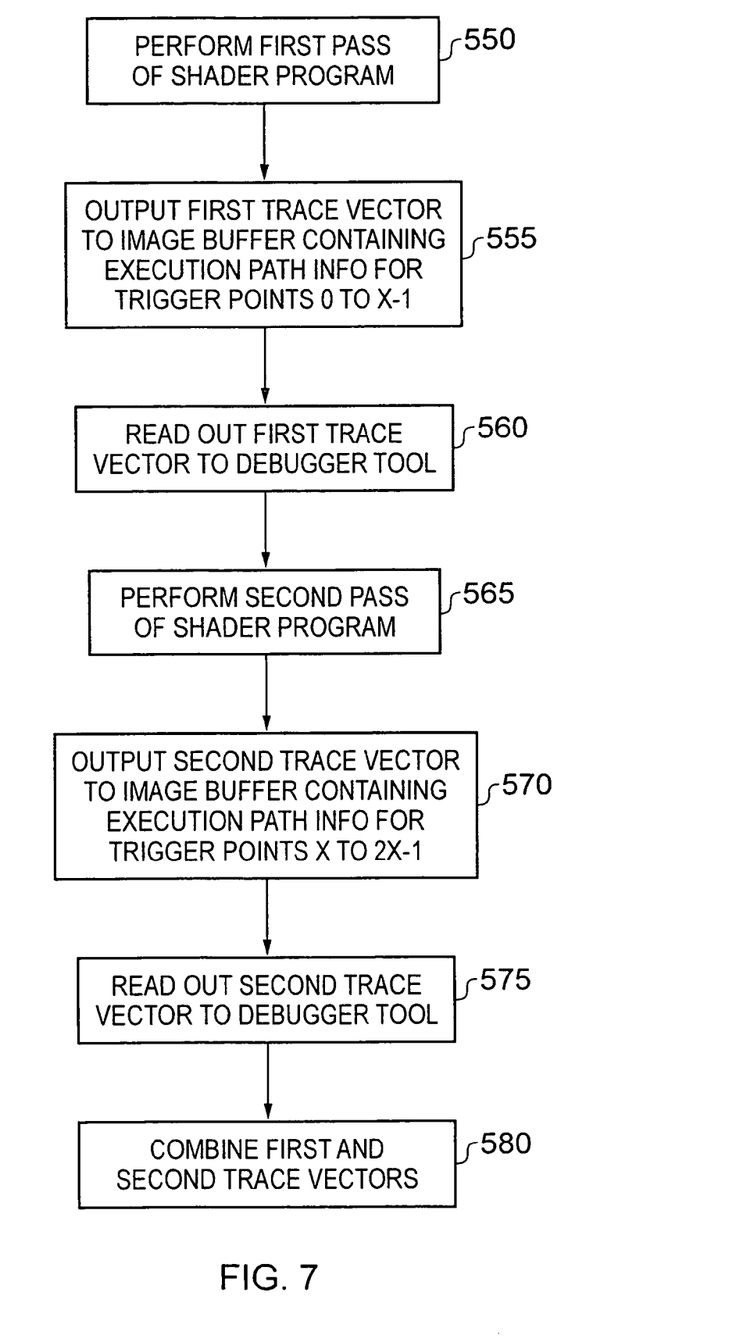
FIG. 7 is a flow diagram illustrating how multiple iterations of the shader program may be used to obtain a plurality of trace vectors for later combining by the debugger tool in accordance with one embodiment of the present invention.

However, in an alternative embodiment as shown in FIG. 7, multiple iterations of the shader program may be used to create multiple trace vectors, each associated with different parts of the shader program, and thereafter those various trace vectors can be combined to form an enlarged trace vector containing all of the required execution path information. In particular, as shown in FIG. 7, at step 550, a first pass of the shader program is performed using the specified input data, and this results at step 555 in the output of a first trace vector to the image buffer containing execution path information for a first set of trigger points, referred to in FIG. 7 as trigger points 0 to X−1. Thereafter, at step 560, this first trace vector can be read out to the debugger tool 50 shown in FIG. 1.

Thereafter, at step 565, a second pass of the shader program is performed, using the same input data, but this time a different set of trigger points are identified. Accordingly, at step 570, a second trace vector is output to the image buffer containing execution path information for this extra set of trigger points, referred to in FIG. 7 as trigger points X to 2X−1. Thereafter, at step 575, the second trace vector is read out to the debugger tool. Then, at step 580, the first and second trace vectors are combined by the debugger tool to provide an enlarged trace vector containing the required items of execution path information.

It will be appreciated that whilst in FIG. 7 the shader program is iterated twice, there is no limitation to the number of times the shader program is iterated, and multiple further iterations can be performed to produce additional trace vectors for combining with the first and second trace vectors.

In FIG. 7, it is assumed that there is a single image buffer 30, and hence it is necessary to read out the first trace vector to the debugger tool 50 before the second trace vector is written to the image buffer. Accordingly, whilst steps 560 and 565 may be performed in parallel, it is necessary for step 560 to occur before step 570. However, in an alternative embodiment, where the image buffer is provided in a portion of main memory, it would be possible between each iteration of the shader program to alter the portion of memory used for the image buffer, so as in effect to allow multiple image buffers to be stored in main memory. In that instance, steps 560 and 575 could be performed after steps 550, 555, 565 and 570, with the two read trace vectors then being combined at step 580.

Figures 8A, 8B:
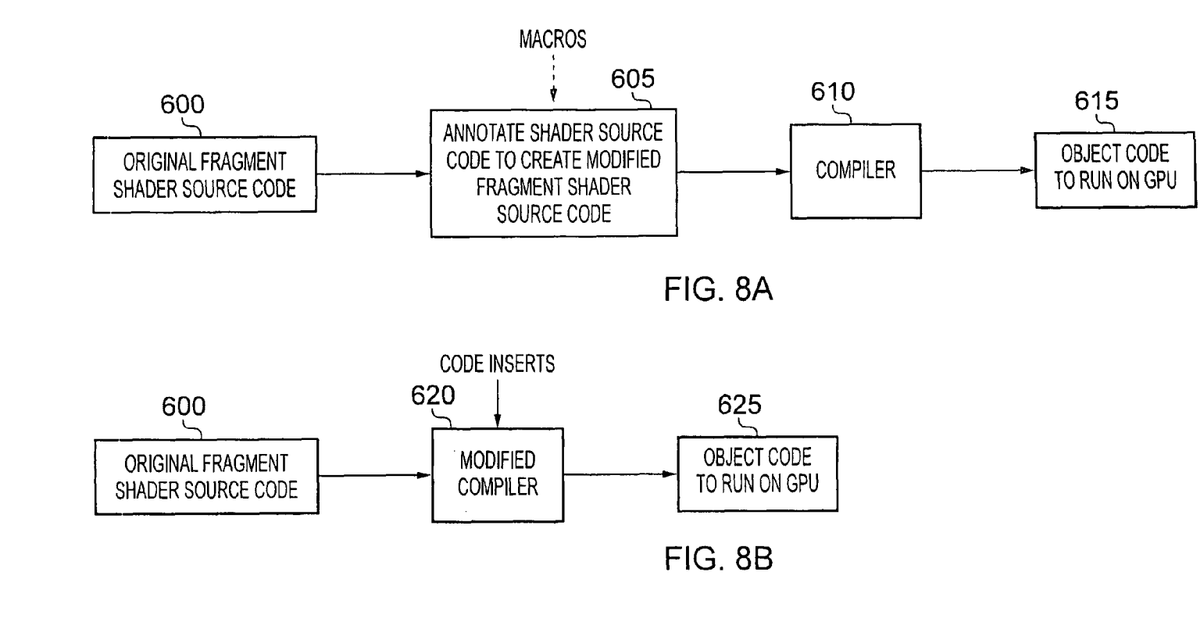
FIGS. 8A to 8C schematically illustrate three alternative mechanisms that can be used to modify either the shader program or the shader circuitry to support a trace mode of operation during which trace vectors are generated.
Figure 8C:
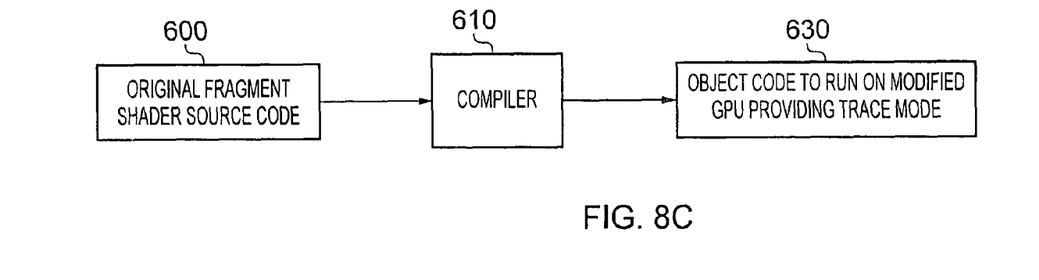

FIGS. 8A to 8C schematically illustrate various ways in which either the fragment shader program or the shader circuitry can be altered to support the trace mode of operation and the generation and output of the trace vector. As shown in FIG. 8A, in one embodiment the original fragment shader source code 600 can be annotated at step 605 in order to create modified fragment shader source code incorporating the required extra program steps for capturing the required items of execution path information and storing those items within the trace vector, and outputting that trace vector in place of the colour value. This process may be done manually, or at least semi-automatically by the insertion of one or more macros into the source code. Thereafter, the modified fragment shader source code is passed through a standard compiler 610 in order to generate the object code 615 which is then run on the GPU. In this embodiment, the fragment shader circuit of the GPU is a standard fragment shader circuit and the support for the trace mode of operation is provided by the modified software.

FIG. 8B illustrates an alternative embodiment where the original fragment shader source code 600 is passed through a modified compiler 620, which automatically inserts the required code portions for capturing the required items of execution path information, adding those items to a trace vector, and ensuring that in the trace mode of operation the resultant trace vector is substituted for the colour value produced by the shader program. Following the compiling process performed by the modified compiler 620, object code 625 is produced which can then be run on a standard GPU with standard shader circuitry.

In an alternative embodiment, as illustrated in FIG. 8C, the original fragment shader source code 600 is passed through a standard compiler 610, resulting in the generation of object code 630 which is then run on a modified GPU providing the trace mode of operation. In particular, in this embodiment, the shader circuitry of the GPU will be modified so as to provide hardware support for the trace mode of operation, allowing the required items of execution path information to be captured, added to the trace vector, and for the trace vector to then be substituted for the colour value prior to output to the image buffer.

In accordance with the above described embodiments of the present invention, an efficient mechanism is provided for capturing execution path information indicative of the execution path taken when a shader program is executed, with that information being stored within a trace vector of the same size as the colour value, and with that trace vector then being stored in an image buffer already provided for the storage of the colour values during normal operation. By re-using the existing image buffer memory for storing such execution path information, this saves power by eliminating the need for an additional trace buffer. Further, multiple items of execution path information can be obtained during a single execution of the shader program, providing detail of the execution path taken by the shader program for a set of input data, which is very useful in a variety of debugging applications. The execution path information obtained using embodiments of the present invention has been found to be particularly useful in the performance of fragment shader optimisation, code coverage measurement and fragment shader debugging.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A data processing apparatus comprising:
   shader circuitry, responsive to input data for a pixel, to execute a shader program to generate a colour value for said pixel, the shader program having multiple execution paths, each execution path identifying a sequence of instructions that, if executed by the shader program, will produce said colour value, and which of said multiple execution paths is taken by said shader circuitry through the shader program is dependent on said input data;
   an image buffer having a plurality of storage locations, each storage location for storing the colour value generated by said shader circuitry for an associated pixel;
   in a trace mode of operation, said shader circuitry configured to execute said shader program to cause a trace vector to be generated containing a plurality of items of execution path information indicative of the execution path taken, the trace vector comprising a plurality of fields, each field being used to store one item of execution path information;
   the trace vector as output being of the same size as the colour value, and in said trace mode of operation said trace vector being stored in one of said storage locations of the image buffer in place of the colour value generated by the shader program.

2. A data processing apparatus as claimed in claim 1, wherein said plurality of items of execution path information comprise a plurality of branch result items, each branch result item identifying whether a corresponding branch operation within the shader program was taken or not taken.

3. A data processing apparatus as claimed in claim 1, wherein said plurality of items of execution path information comprise one or more loop count items, each loop count item identifying a number of times a corresponding loop within the shader program was repeated.

4. A data processing apparatus as claimed in claim 1, further comprising compression means for receiving the trace vector generated during execution of the shader program and for compressing the trace vector to an output form the same size as the colour value prior to output of the trace vector to the image buffer.

5. A data processing apparatus as claimed in claim 1, further comprising hashing means for receiving the trace vector generated during execution of the shader program and for applying a hash operation to convert the trace vector into an output form the same size as the colour value prior to output of the trace vector to the image buffer.

6. A data processing apparatus as claimed in claim 1, wherein:
   in the trace mode of operation the shader program is executed multiple times using the same input data to produce multiple trace vectors, each trace vector containing a plurality of items of execution path information relating to different parts of the shader program;
   the data processing apparatus further comprising debugger means for obtaining each trace vector from the image buffer and for combining the multiple trace vectors to produce an enlarged trace vector containing execution path information indicative of the execution path taken through the shader program.

7. A data processing apparatus as claimed in claim 6, wherein the debugger means is arranged to obtain from the image buffer a current trace vector produced by a current iteration of the shader program before a next trace vector produced by a next iteration of the shader program is stored in the image buffer.

8. A data processing apparatus as claimed in claim 1, wherein the shader circuitry has multiple execution pipelines, such that multiple instances of the shader program are executed in parallel, each instance of the shader program operating on input data for different pixels.

9. A data processing apparatus as claimed in claim 1, wherein for at least one item of execution path information the trace vector is arranged to store supplemental information relevant to that item of execution path information.

10. A data processing apparatus as claimed in claim 1, wherein the shader program contains code portions that generate the trace vector during the trace mode of operation.

11. A data processing apparatus as claimed in claim 10, wherein the code portions are added into the shader program by passing the shader program through a compiler which inserts those code portions at locations within the shader program associated with predetermined execution path trace trigger points.

12. A data processing apparatus as claimed in claim 1, wherein the shader circuitry includes hardware for generating the trace vector during the trace mode of operation.

13. A data processing apparatus as claimed in claim 1, wherein the shader circuitry is provided within a graphics processing unit (GPU).

14. A data processing apparatus as claimed in claim 1, wherein the shader circuitry is fragment shader circuitry, and the shader program is a fragment shader program.

15. A method of generating execution path information when executing a shader program on shader circuitry, the method comprising the steps of:
   responsive to input data for a pixel, executing the shader program to generate a colour value for said pixel, the shader program having multiple execution paths, each execution path identifying a sequence of instructions that, if executed by the shader program, will produce said colour vector, and which of said multiple execution paths is taken by the shader circuitry through the shader program is dependent on said input data;

storing the colour value generated by said shader circuitry in an image buffer;

in a trace mode of operation, executing said shader program on said shader circuitry to cause a trace vector to be generated containing a plurality of items of execution path information indicative of the execution path taken, the trace vector comprising a plurality of fields, each field being used to store one item of execution path information;

the trace vector as output being of the same size as the colour value, and in said trace mode of operation the method further comprising the steps of storing said trace vector in a storage location of the image buffer in place of the colour value generated by the shader program.

16. A non-transitory computer readable storage medium storing a computer program which, when executed on a computer, provides a compiler tool for creating a shader program from an initial shader program by inserting code portions at locations within the initial shader program associated with predetermined execution path trace trigger points, such that when said shader program is executed on shader circuitry, the method of generating execution path information in accordance with claim 15 is performed.

17. A graphics processing unit comprising:

shader circuitry, responsive to input data for a pixel, to execute a shader program to generate a colour value for said pixel, the shader program having multiple execution paths, each execution path identifying a sequence of instructions that, if executed by the shader program, will produce said colour vector, and which of said multiple execution paths is taken by said shader circuitry through the shader program is dependent on said input data;

the shader circuitry being arranged to output the colour value for storage in an image buffer having a plurality of storage locations, each storage location for storing the colour value generated by said shader circuitry for an associated pixel;

in a trace mode of operation, said shader circuitry configured to execute said shader program to cause a trace vector to be generated containing a plurality of items of execution path information indicative of the execution path taken, the trace vector comprising a plurality of fields, each field being used to store one item of execution path information;

the trace vector as output being of the same size as the colour value, and in said trace mode of operation said trace vector being output for storing in one of said storage locations of the image buffer in place of the colour value generated by the shader program.

* * * * *